United States Patent
Russell et al.

(10) Patent No.: US 6,284,178 B1
(45) Date of Patent: Sep. 4, 2001

(54) METHODS OF PRODUCING CROSSLINKED POLYETHYLENE PRODUCTS

(75) Inventors: Robert G. Russell, Sulphur Springs; Robert S. Stachowiak, Commerce; Gary L. Runyan, Plano; Patrick A. Bancroft, Abilene, all of TX (US)

(73) Assignee: United States Brass Corporation, Dallas, TX (US)

( * ) Notice: Subject to any disclaimer, the term of this patent is extended or adjusted under 35 U.S.C. 154(b) by 0 days.

(21) Appl. No.: 09/336,185

(22) Filed: Jun. 18, 1999

(51) Int. Cl.$^7$ .................................................. B29C 35/02
(52) U.S. Cl. ...................... 264/211.24; 264/236
(58) Field of Search ........................... 264/210.2, 211.24, 264/236, 296, 322

(56) References Cited

U.S. PATENT DOCUMENTS

| | | |
|---|---|---|
| 1,128,156 | 2/1915 | Lamb . |
| 1,731,988 | 10/1929 | Skillman . |
| 2,699,575 | 9/1955 | Haury . |
| 2,974,367 | 3/1961 | Doering et al. . |
| 3,047,910 | 8/1962 | Dowus . |
| 3,102,303 | 9/1963 | Laiuson . |
| 3,205,289 | 9/1965 | Carpenter . |
| 3,270,117 | 8/1966 | Houson . |

(List continued on next page.)

FOREIGN PATENT DOCUMENTS

| | | |
|---|---|---|
| 733643 | 3/1943 | (DE) . |
| 2205586 | 8/1973 | (DE) . |
| 2248471 | 4/1974 | (DE) . |
| 2733643 | 2/1979 | (DE) . |
| 2836798 | 3/1980 | (DE) . |
| 2940219 | 4/1981 | (DE) . |
| 4135017 | 4/1993 | (DE) . |
| 4423372 | 1/1996 | (DE) . |
| 877735 | 9/1961 | (GB) . |
| 1336869 | 11/1973 | (GB) . |
| 53-56241 | 5/1978 | (JP) . |
| 56-150511 | 11/1981 | (JP) . |
| 57-8110 | 1/1982 | (JP) . |
| 4-198201 | 7/1992 | (JP) . |
| 5-156032 | 6/1993 | (JP) . |

OTHER PUBLICATIONS

Examination of Cross Linked Polyethylene for Heating Systems, R. A. Rosseen & J. E. Bergman (Undated).
Water and Pipes pp. 31–33 (Undated).
HIS311 Schiebehülse pp. 3–44 Technise Information (Undated).
System Components JRG Sandex Pipes and Installation Guide Handbook 88–1 (Undated).
Pipes for Floor–Heating and Domestic Hot Water Supply Golan Plastic Products (Undated).
Standard Specification for Cross Linked Polythylene (PEX) Tubing by American Society of Testing and materials. Designation: F 876–93 pp. 942–946.
Polymer Cross Linking with Union Carbide Organofunctional Silau A–171 by Union Carbide (1992). SC–1702.
Advances in Silane Crosslinking of Polythylene by L. M. Panzer (Undated).
Methods and Benefits of Crosslinking Polyolefins for Industrial Applications by Colin Bereridge & Andrew Saviston (Undated).
Standard Specification for Crosslinked Polyethylene (PEX) Plastic Hot and Cold Water Distribution Systems by ASTM Committee F–17 (Undated).

*Primary Examiner*—Leo B. Tentoni
(74) *Attorney, Agent, or Firm*—Konneker & Smith, P.C.

(57) ABSTRACT

A method of producing crosslinked reformed products provides such products which are, in one embodiment, produced by the monosil process and suitable for use in potable water applications. In a described embodiment, a method includes the steps of introducing a reduced level of silane in a feed throat of an extruder, extruding a product, reforming the extruded product, and then curing the reformed product for an extended period of time.

4 Claims, 2 Drawing Sheets

U.S. PATENT DOCUMENTS

| | | |
|---|---|---|
| 3,360,826 | 1/1968 | Larang . |
| 3,370,118 | 2/1968 | Lowe . |
| 3,418,409 | 12/1968 | Hesse et al. . |
| 3,448,491 | 6/1969 | Sosnowski, Jr. et al. . |
| 3,495,301 | 2/1970 | Stephaus et al. . |
| 3,509,252 | 4/1970 | Baeut . |
| 3,509,599 | 5/1970 | Driza et al. . |
| 3,557,278 | 1/1971 | Kuthemann . |
| 3,599,287 | 8/1971 | Buck . |
| 3,601,852 | 8/1971 | Bjalme . |
| 3,672,804 | 6/1972 | Dalik . |
| 3,755,524 | 8/1973 | McKay . |
| 3,806,301 | 4/1974 | Osterhagen et al. . |
| 3,823,216 | 7/1974 | Petzetakis . |
| 3,843,300 | 10/1974 | McFarlane . |
| 3,899,565 | 8/1975 | de Putter et al. . |
| 3,910,744 | 10/1975 | Rouden et al. . |
| 3,923,947 | 12/1975 | Cook . |
| 3,929,943 | 12/1975 | Klimaszewski, Jr. . |
| 3,982,871 | 9/1976 | Moddel . |
| 3,986,810 | 10/1976 | La Branche et al. . |
| 4,028,037 | 6/1977 | Dawson . |
| 4,059,379 | 11/1977 | Rorff et al. . |
| 4,065,243 | 12/1977 | Acdast et al. . |
| 4,083,918 | 4/1978 | Rouden et al. . |
| 4,102,623 | 7/1978 | Mathison . |
| 4,107,249 | 8/1978 | Murai et al. . |
| 4,113,813 | 9/1978 | Wilson . |
| 4,117,195 | 9/1978 | Sugarbrick et al. . |
| 4,131,407 | 12/1978 | de Putteret et al. . |
| 4,140,739 | 2/1979 | Cotten . |
| 4,167,388 | 9/1979 | Keelor et al. . |
| 4,219,525 | 8/1980 | Greenspan . |
| 4,264,661 | 4/1981 | Braudolf . |
| 4,269,801 | 5/1981 | Klasema et al. . |
| 4,271,218 | 6/1981 | Heckel et al. . |
| 4,276,010 | 6/1981 | Shartzer . |
| 4,279,853 | 7/1981 | Ohta et al. . |
| 4,289,716 | 9/1981 | Voigt . |
| 4,316,870 | 2/1982 | Rowley . |
| 4,323,337 | 4/1982 | Korff et al. . |
| 4,333,898 | 6/1982 | Schmidtdien . |
| 4,345,956 | 8/1982 | Cox et al. . |
| 4,379,115 | 4/1983 | Seach et al. . |
| 4,383,966 | 5/1983 | Srettik . |
| 4,394,343 | 7/1983 | Acda et al. . |
| 4,404,159 | 9/1983 | McFarlane . |
| 4,406,852 | 9/1983 | Riegel . |
| 4,426,497 | 1/1984 | Rent . |
| 4,428,900 | 1/1984 | Riley et al. . |
| 4,446,084 | 5/1984 | Rowley . |
| 4,446,283 | 5/1984 | Doi et al. . |
| 4,457,886 | 7/1984 | Acda et al. . |
| 4,525,136 | 6/1985 | Rowley . |
| 4,664,423 | 5/1987 | Rowley . |
| 4,803,033 | 2/1989 | Rowley . |
| 4,857,250 | 8/1989 | Gale et al. . |
| 4,891,173 | 1/1990 | Saitoh et al. . |
| 4,902,460 | 2/1990 | Yagi et al. . |
| 4,927,184 | 5/1990 | Bourjot et al. . |
| 5,244,122 | 9/1993 | Rumberger . |
| 5,505,900 | 4/1996 | Siwands et al. . |
| 5,514,312 | 5/1996 | Hardy et al. . |
| 5,573,822 | 11/1996 | Nishikawa et al. . |
| 5,622,670 | 4/1997 | Rowley . |
| 5,756,023 | 5/1998 | Stachowiak . |
| 5,792,532 | 8/1998 | Pfleger . |
| 5,861,200 | 1/1999 | Rowley . |

METHODS OF PRODUCING CROSSLINKED POLYETHYLENE PRODUCTS

BACKGROUND OF THE INVENTION

The present invention relates generally to manufacturing methods and, in an embodiment described herein, more particularly provides a method of producing crosslinked polyethylene products.

It is well known to produce crosslinked polyethylene products using a process conventionally known as the "monosil" process. Unfortunately, however, the monosil process is generally considered to be unsuitable for producing products which are to be used in potable water applications in the United States where it is generally used for wire insulation products. This is due to the fact that regulated extractants, such as methanol, may be released as a by-product of the crosslinking process.

Additionally, there exists a need for methods of conveniently and economically producing reformed products which are made of highly crosslinked material. However, products which are highly crosslinked are typically not easily reformed. For example, forming an enlarged sealing surface on a highly crosslinked tubular product usually results in an objectionable fold or other anomaly on the seal surface.

From the foregoing, it can be seen that it would be quite desirable to provide methods of producing crosslinked polyethylene products, which use the monosil process for crosslinking the polyethylene, but which produce products satisfactory for use in potable water applications. In addition, it would be desirable to provide methods for conveniently and economically producing highly crosslinked reformed products. It is accordingly an object of the present invention to provide such methods.

SUMMARY OF THE INVENTION

In carrying out the principles of the present invention, in accordance with an embodiment thereof, a method is provided which economically reduces the amount of silane used in the monosil process, produces conveniently reformable products, and which produces products satisfactory for use in potable water applications.

In one embodiment of the invention, the method includes the steps of preheating base polyethylene to approximately 160° F., blending the base polyethylene with a master batch of additives, introducing silane, peroxide and a catalyst in the feed throat of an extruder, extruding a product, reforming the product, and then curing the reformed product.

In one aspect of the present invention, a reduced quantity of silane is utilized in the described monosil process. For example, the combined silane, peroxide and catalyst may be 1.6–1.8% of the mixture extruded.

In another aspect of the present invention, an extruded product produced by the monosil process is reformed, after the extrusion step, but before the product is cured to an elevated crosslinked percentage. In this manner, the extruded product is reformed to its final shape before elevated crosslinking prevents convenient and effective reforming.

In still another aspect of the present invention, a product produced by the monosil process is treated to reduce levels of regulated extractants. The product may then be used in potable water applications.

These and other features, advantages, benefits and objects of the present invention will become apparent to one of ordinary skill in the art upon careful consideration of the detailed description of a representative embodiment of the invention hereinbelow and the accompanying drawings.

DETAILED DESCRIPTION

Figure 1:
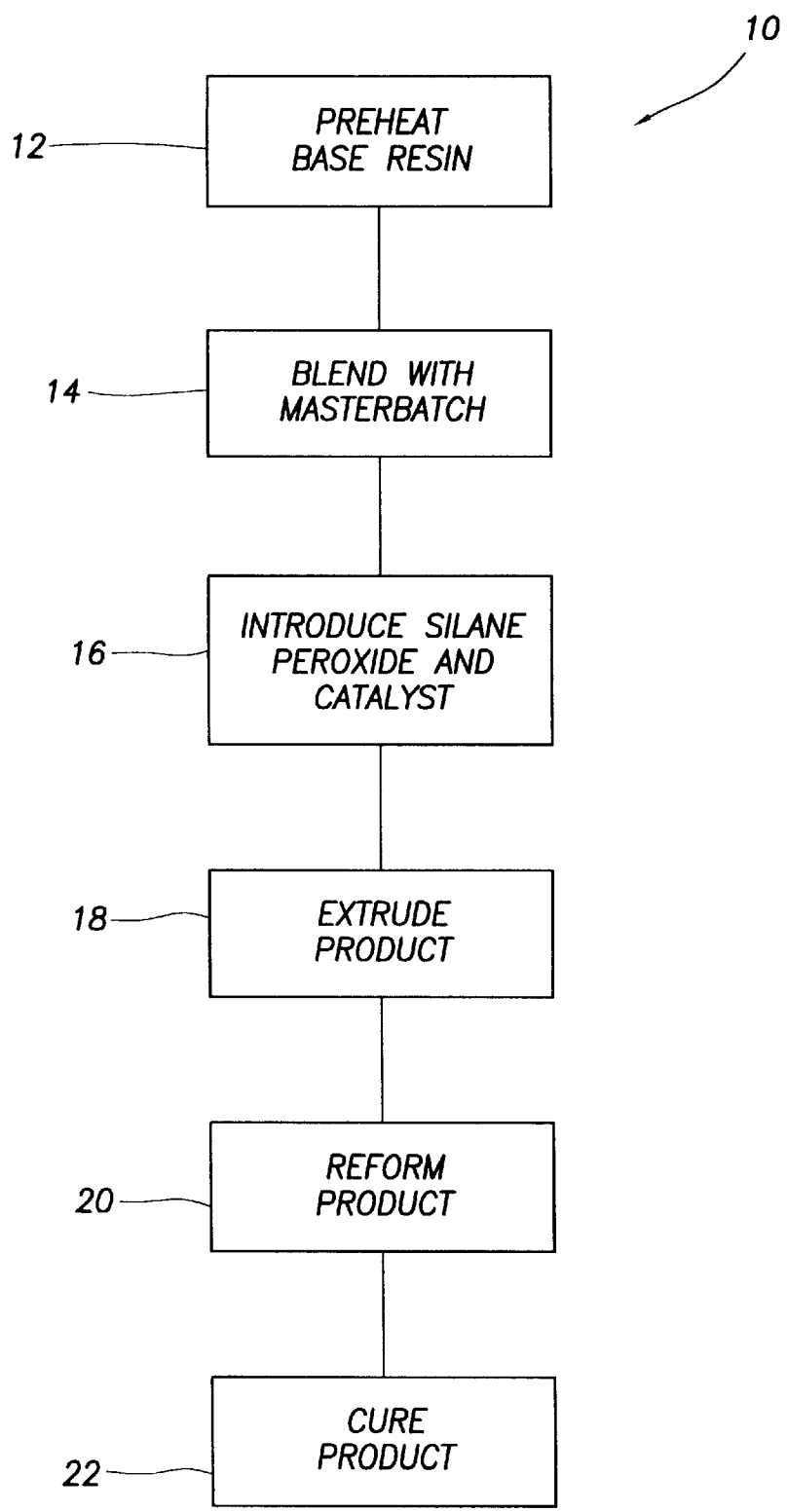
FIG. 1 schematically illustrates a method of producing crosslinked polyethylene products, the method embodying principles of the present invention.

Representatively illustrated in FIG. 1 is a method 10 which embodies principles of the present invention. It is to be clearly understood, however, that the method 10 is merely representative of an embodiment of the principles of the present invention, and that various modifications may be made to the method without departing from the principles of the present invention.

In an initial step 12 of the method 10, a base resin is preheated. Where polyethylene is used as the base resin, it may be preheated to approximately 160° F. Examples of suitable polyethylene base resins include Exxon HD 6706 and Solvay T50–500, and mixtures of these. Other base resins, and other types of base resins, may be utilized in a method incorporating principles of the present invention.

In a subsequent step 14 of the method 10, the preheated base resin is blended with a "master batch" of additives. For example, the master batch may include an antioxidant (such as Irganox B215, Irganox 1010, and mixtures of these), a metal deactivator (such as Naugard XL–1), and a processing aid or lubricant (such as Dyneon FX–9613). Further additives may include a UV stabilizer or inhibitor (such as Tinuvin 111), and a pigment (such as titanium dioxide and/or carbon black).

In a step 16 of the method 10, silane, peroxide and a catalyst are introduced into the mixture. In this manner, the monosil process is utilized to produce the desired product. A suitable combined silane, catalyst and peroxide is Osi Y-11911. Preferably, the combined silane, peroxide and catalyst is approximately 1.6–1.8% of the mixture, typically less than 1.8%, as measured at the time the silane, peroxide and catalyst are introduced to the mixture. This ratio is less than that normally used, and results in a more economical overall manufacturing process. Where the product is to be initially formed by extrusion, preferably the silane, peroxide and catalyst are introduced in a feed throat of the extruder. This may be accomplished using a commercially-available extruder well known to those skilled in the art and manufactured by Nokia-Maillefer.

One formulation utilized by the applicants is as follows, in which percentages are given by weight:

| | |
|---|---|
| Exxon HD 6706 | 93.4% |
| Solvay T50-500 | 4.355% |
| Irganox B215 | 0.3% |
| Irganox 1010 | 0.2% |
| Naugard XL-1 | 0.1% |
| Dyneon FX-9613 | 0.045% |
| Osi Y-11911 | 1.6% |

In a step 18 of the method 10, the mixture is extruded, thereby initially forming the product in an elongated tubular shape. At this point, the product may be approximately 4–10% crosslinked, typically 10% or less. Of course, other extruded shapes, and shapes formed other than by extruding, may be produced in a method incorporating principles of the present invention. Additionally, the product may be more or less than 4–10% crosslinked at this point, without departing from the principles of the present invention.

In a step 20 of the method 10, the product is reformed. For example, an enlarged sealing surface may be formed on a tubular product as described in U.S. Pat. No. 5,879,723, the disclosure of which is incorporated herein by this reference. If such a sealing surface is to be formed on the product, preferably the product is heated to an elevated temperature and then reformed between a pair of mating dies. However, it is to be clearly understood that other procedures may be followed for reforming the product without departing from the principles of the present invention.

Prior to reforming, the product is preferably crosslinked to a level not greater than 60%. Some crosslinking after extrusion of the product may occur in storage, etc.

In a step 22 of the method 10, the product is cured after it is reformed as described above. In one important aspect of the present invention, the curing step 22 is utilized in a manner which both increases the crosslinking of the product's material, thereby enhancing its structural properties, and decreases the amount of regulated extractants in the material. The curing step 22 has been accomplished by the applicants by placing a reformed tubular product, prepared as described above, in a steam chamber at an elevated temperature of preferably approximately 180° F., or at least approximately 160° F., for an extended period of time, beyond that which is generally accepted as being recommended for achieving a relatively high percentage of crosslinking in the material. At the completion of the curing step, the product material may be approximately 65–89% crosslinked, typically at least 60% crosslinked. Of course, other procedures for curing the product in the presence of water may be followed without departing from the principles of the present invention.

Figure 2:
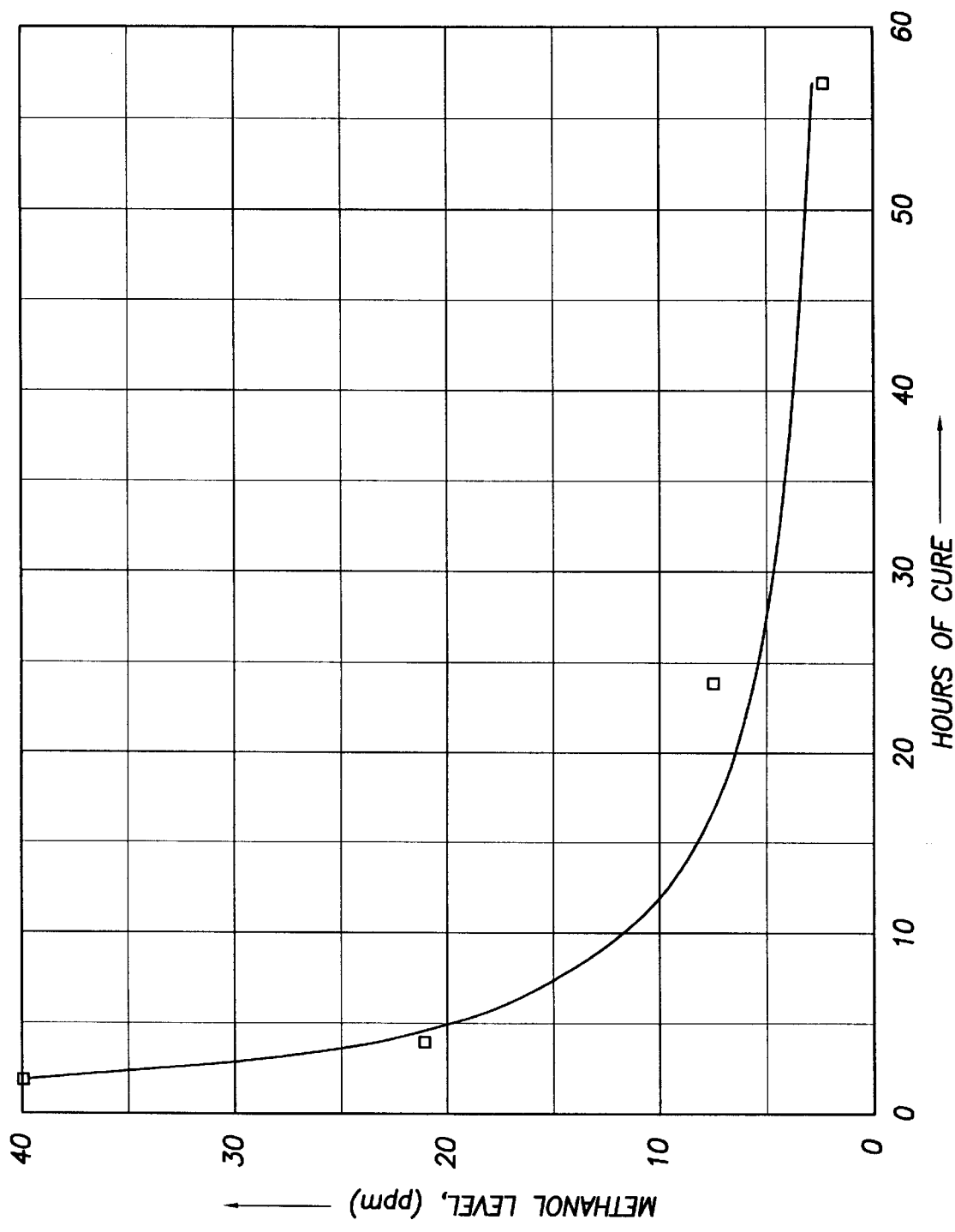
FIG. 2 is a graph illustrating the effect of cure time on level of methanol in the method.

The applicants have discovered that at least one regulated extractant, methanol, which is produced as a by-product of the chemical reaction in silane grafted crosslinking, may be reduced by extending the cure time. Referring additionally now to FIG. 2, a graph of extracted methanol in parts per million (ppm) vs. hours of cure is representatively illustrated. The data shown in the graph is representative of several actual samples produced by the applicants and the graph indicates the concentration of extracted methanol as tested 15 days after initiation of the test. A curve has been plotted on the graph using a technique known as a power curve fit, with the data from the actual tests.

Note that the FIG. 2 graph shows that approximately two hours of curing produces a concentration of extracted methanol of about 40 parts per million (ppm), but that approximately 57 hours of curing produces a concentration of about 2.3 ppm. The other data points on the graph correspond to an approximately four hour curing time, producing a concentration of about 21 ppm, and an approximately 24 hour curing time, producing a concentration of about 7.5 ppm. This dramatic reduction in concentration of a regulated extractant may be utilized to produce products suitable for potable water applications. For example, if it is desired to reduce the concentration of extracted methanol to a maximum of 12.2 ppm, a curing time of approximately 9 hours, or at least approximately 8 hours, would be indicated by the curve in the FIG. 2 graph. From the actual data points it can be seen that a curing time of greater than approximately 4 hours would be indicated, since at this curing time the concentration of extracted methanol was about 21 ppm.

With the method 10 as described above, products produced using the monosil process may be made suitable for potable water applications, even though the monosil process has generally been considered unacceptable for producing products for potable water applications in the United States. One measure of potability is provided by a standard well known to those skilled in the art as ANSI/NSF 61, promulgated by the American National Standards Institute and NSF International, and which is fully incorporated herein by this reference. The standard defines a test for potability in which the concentration of extractants from a product is measured 15 days after initiation of the test. As used herein, the term "methanol extraction value" is defined as the concentration of methanol extracted from a product according to the ANSI/NSF 61 standard, measured in parts per million. The examples given above of products produced by the method 10 were tested using the ANSI/NSF 61 standard. Thus, the products in the examples given above had methanol extraction values of 40, 2.3, 21 and 7.5, respectively. Products having a methanol extraction value of approximately 12.2 or less are suitable for potable water applications, for example, for use as residential water conduits, etc.

Thus has been described the method 10 in which a reduced level of silane, peroxide and catalyst, and an extended cure time, are utilized to conveniently produce a crosslinked reformed product suitable for potable water applications. Of course, many modifications, additions, deletions, substitutions and other changes to the method 10 would be apparent to a person skilled in the art upon careful consideration of the above detailed description of the method, and these changes are contemplated by the principles of the present invention. Accordingly, the foregoing detailed description is to be clearly understood as being given by way of illustration and example only, the spirit and scope of the present invention being limited solely by the appended claims.

What is claimed is:

1. A method of producing a crosslinked product, the method comprising the steps of:

forming the product using the monosil process, wherein the forming step includes preparing a mixture of silane and a base resin within an extruder prior to melting the base resin in the extruder, and extruding the product from the extruder; and curing the product at an elevated temperature in the presence of water so that the product is at least approximately 60% crosslinked and so that the product has a maximum methanol extraction value of approximately 12.2.

2. The method according to claim 1, wherein in the preparing step the mixture includes a maximum of approximately 1.8% by weight of the silane, a peroxide and a catalyst.

3. A method of producing a crosslinked product, the method comprising the steps of:

forming the product using the monosil process; and curing the product at an elevated temperature in the presence of water so that the product is at least approximately 60% crosslinked, so that the product has a maximum methanol extraction value of approximately 12.2, and wherein the curing step is performed for a minimum of approximately 8 hours.

4. A method of producing a crosslinked product, the method comprising the steps of:

forming the product using the monosil process; and curing the product at an elevated temperature in the presence of water so that the product is at least approximately 60% crosslinked, so that the product has a maximum methanol extraction value of approximately 12.2, and wherein the curing step is performed for greater than approximately 4 hours.

* * * * *